United States Patent [19]
Puhl

[11] Patent Number: 5,823,935
[45] Date of Patent: Oct. 20, 1998

[54] FIBER DENSIFICATION KNIFE

[75] Inventor: Michael K. Puhl, Victorville, Calif.

[73] Assignee: Tetra Laval Holdings & Finance, S.A., Pully, Switzerland

[21] Appl. No.: 795,145

[22] Filed: Feb. 7, 1997

[51] Int. Cl.$^6$ ..................................... B31F 1/00
[52] U.S. Cl. ..................... 493/354; 493/464; 493/468; 493/402
[58] Field of Search .................. 493/340, 370, 493/372, 464, 468, 471, 352–355, 402, 403, 404; 30/357; 72/325

[56] References Cited

U.S. PATENT DOCUMENTS

| | | | |
|---|---|---|---|
| 2,521,985 | 9/1950 | Lang et al. | 154/101 |
| 3,060,816 | 10/1962 | Martin | 493/354 |
| 3,481,813 | 12/1969 | Wiggers | 493/354 |
| 3,899,120 | 8/1975 | Fradkin | 229/32 |
| 3,972,270 | 8/1976 | Marshall | 93/58 R |
| 4,007,671 | 2/1977 | Duncan | 93/58 ST |
| 4,195,557 | 4/1980 | Kang | 93/59 R |
| 4,518,377 | 5/1985 | Skinner | 493/58 |
| 4,582,555 | 4/1986 | Bower | 156/290 |
| 4,596,541 | 6/1986 | Ward, Sr. et al. | 493/59 |
| 4,625,534 | 12/1986 | Hemmi et al. | 72/326 |
| 4,824,714 | 4/1989 | Gest | 428/156 |
| 4,968,291 | 11/1990 | Baldacci | 493/354 |
| 4,989,736 | 2/1991 | Anderson et al. | 206/631.3 |
| 5,015,223 | 5/1991 | Boeckmann | 493/194 |
| 5,021,117 | 6/1991 | Boeckmann | 156/515 |
| 5,023,033 | 6/1991 | Cakmakci | 264/161 |
| 5,298,010 | 3/1994 | Levine | 493/354 |
| 5,393,295 | 2/1995 | Knecht | 493/403 |
| 5,466,211 | 11/1995 | Komarek | 493/354 |
| 5,501,394 | 3/1996 | Eno | 229/137 |

*Primary Examiner*—Jack W. Lavinder
*Attorney, Agent, or Firm*—Michael A. Catania

[57] ABSTRACT

A cutting device for effecting a cut in a board-like fibrous material and densifying an area adjacent to the cut, includes a main body portion and a blade portion extending from the main body portion. The blade portion includes a cutting edge having first and second angled surfaces extending divergingly therefrom. A densifying member extends outwardly from at least one of the first and second angled surfaces. The densifying member compresses an area of the material adjacent to the cut as the blade is pressed into the material and densifies the adjacent area. The compression surface may be configured non-planar with an upper surface of the board-like material to selectively, variably densify the area adjacent to the cut.

2 Claims, 4 Drawing Sheets

FIBER DENSIFICATION KNIFE

FIELD OF THE INVENTION

This invention relates to a knife for cutting fibrous material. More particularly, the invention relates to a knife for cutting fibrous material such as paperboard and the like and densifying the material in an area adjacent to the cut.

BACKGROUND OF THE INVENTION

Fiber based products, such as paperboard and the like, are in widespread use in the construction and manufacture of packaging materials. Such materials are used, in part, because of their ease of forming, e.g., creasing and folding, and relatively low cost. Paperboard materials will be recognized by most consumers as one of the most commonly used packaging materials for many different types of products.

Fiber based materials have also come into use in the construction and manufacture of liquid packaging materials. Again, this is due, in part, to the lower cost of fiber based materials, vis-a-vis polymeric, i.e., plastic container materials. Fiber based containers are also significantly easier to manufacture compared to containers molded from plastic materials.

Advances in fiber based, e.g., paperboard, technology enable the use of paperboard for liquid food packaging materials. Paperboard based materials are now recognized as a preferred container material for many types of liquid foods. For example, juice, milk and the like, are commonly packaged in paperboard based materials. Non-food items such as laundry detergent, laundry softeners and the like are also commonly found packaged in paperboard packaging.

It has been observed that paperboard packaging can be problematic for liquids products. One known problem is that the liquid product can be absorbed into the packaging material by a wicking phenomena which occurs at the edges of the material which come into contact with the liquid. Liquid wicks, or is transported from the edges of the packaging material into the paperboard body of the container material. Wicking can compromise the structural integrity of the package, and can cause contamination of the food product packaged in the container.

Wicking can be reduced or eliminated by sufficiently increasing the density of the packaging material. This is typically effected by increasing the density and thus the weight of the entirety of the material package. While this is a somewhat effective solution, the material and manufacturing costs increase commensurately with increased material weight.

Accordingly, there continues to be a need for a cost effective densified packaging material which effectively reduces or eliminates wicking of the liquid product into the packaging material. Preferably, such a packaging material has selectively densified areas to maintain the low cost advantages and other benefits of paperboard packaging.

SUMMARY OF THE INVENTION

A cutting device for effecting a cut in a board-like fibrous material and densifying an area adjacent to the cut, includes a main body portion and a blade portion extending from the main body portion. The blade portion has a cutting edge having first and second angled surfaces extending divergingly therefrom. The cutting device includes a densifying member which extends outwardly from at least one of the first and second angled surfaces.

The cutting device is positioned with the blade portion in contact with, and impressed into, the fibrous material. The blade effects a crush cut of the material, while the densifying member compresses an area of the material adjacent to the cut and densifies the adjacent area.

The cutting device may be configured to selectively, variably densify the area adjacent to the cut by having a compression surface which is non-planar with an upper surface of the board-like material.

An alternate embodiment of the cutting device includes first and second densifying members extending outwardly from a respective one of the angled, diverging surfaces. Each of the densifying members defines a compression surface adapted to compress an area adjacent to its respective side of the cut and densifying the respective areas. The densifying members and compression surfaces can be alike to effect consistent densification of the areas on the sides adjacent to the cut. Alternatively, either or both of the densifying members can be configured differently from one another to effect different densification properties to achieve specific, desired results.

In a present embodiment, the densifying member extends from the angled surface at about a midpoint of the surface.

Other features and advantages of the present invention will be apparent from the following detailed description, the accompanying drawings, and the appended claims.

DETAILED DESCRIPTION OF THE PREFERRED EMBODIMENTS

Figure 1:
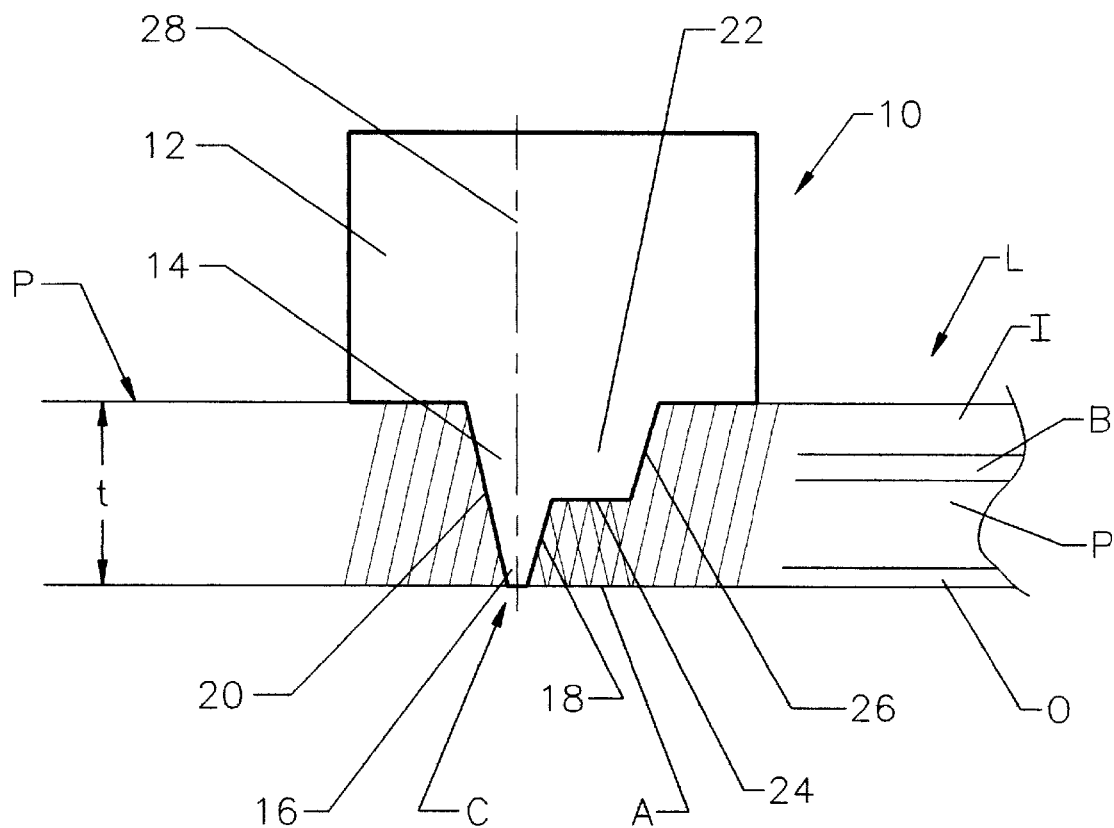
FIG. 1 is a side elevational view of a cutting device embodying the principles of the present invention, the device being illustrated pressed into an exemplary laminated paperboard sheet.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
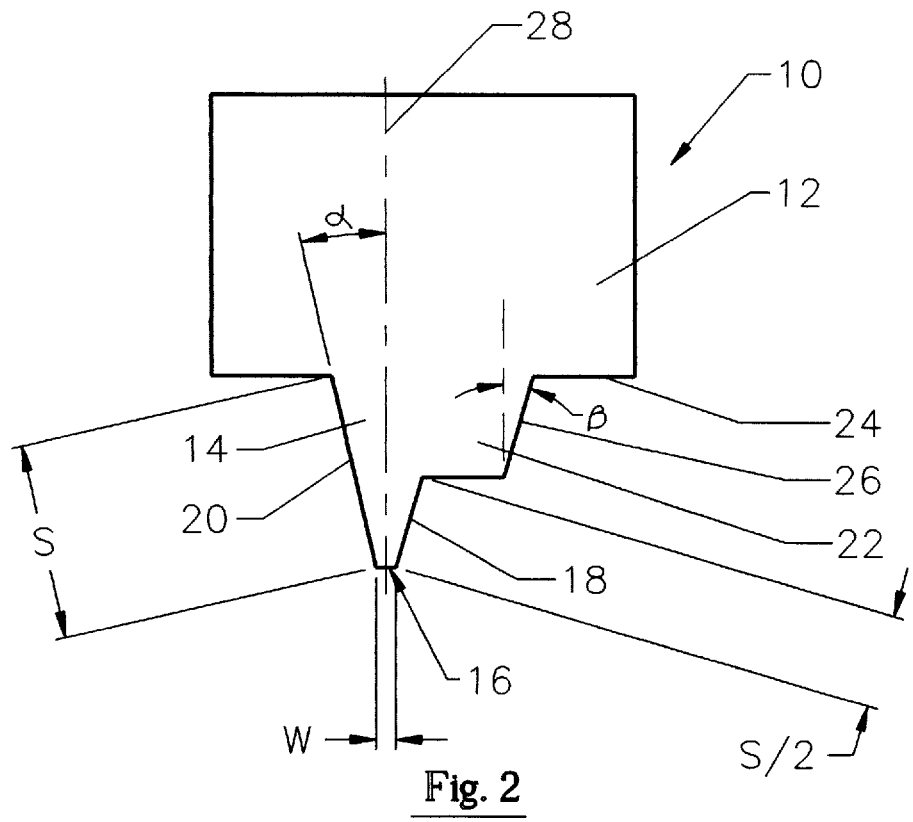
FIG. 2 is a side elevational view of the cutting device of FIG. 1, without the paperboard sheet.

With reference now to the figures, and in particular to FIGS. 1 and 2, there is shown an embodiment of the cutting device 10 of the present invention. The cutting device 10 includes generally a main body portion 12 and a blade portion 14. The blade portion 14 has a cutting edge 16 and includes first and second adjacent, angled surfaces 18, 20. The surfaces 18, 20 extend upwardly, diverging from the cutting edge 16.

The cutting device 10 is configured for use with most types of fibrous materials. The device is particularly useful for cutting fibrous material, such as paperboard, formed as a blank or sheet, which is used for manufacturing packing for liquid products. As will be recognized by those skilled in the art, the use of fibrous material, such as paperboard, for liquid product packaging has been significantly increasing. Examples of such uses of paperboard for liquid packaging include food products such as juices, milk and the like.

The packaging material can be formed of, for example, a plurality of layers, or a laminate of various materials, one or more of which layers is a fibrous material. One typical laminate L, as illustrated in FIG. 1, includes an inner layer of thermoplastic material I, such as low density polyethylene (LDPE), a barrier material B such as metal foil, a paperboard layer P, and an outer layer O of thermoplastic material, such as LDPE. Laminated container structures are disclosed in Andersson et al., U.S. Pat. No. 4,989,736, which patent is incorporated herein by reference.

It will also be recognized by those skilled in the art, that particularly in the food packaging industry, it is of utmost importance to provide sterile, uncontaminated packaging materials and packaging designs which further the objective of reducing or eliminating the potential for contamination of the food product. To that end, it has been observed that the wicking can occur at the edges of fibrous packaging material which is exposed to the liquid product stored in the package. The wicking phenomena draws liquid from the exposed edges into the body of the material. This can be problematic in that liquid in the body of the packaging material can compromise the structural integrity of the package, and may result in contamination of the food product. This can be particularly significant in the food packaging industry.

It has also been observed that the wicking phenomena is inversely proportional to the density of the packaging material. That is, as the density of the packaging material increases, the amount of liquid absorbed, and/or the rate of absorption decreases. Thus, it would be desirable to provide packaging material which is relatively dense at the edges which come into contact with the liquid product, which edges are susceptible to wicking, in order to reduce the amount of liquid which the packaging material absorbs.

The present cutting device 10 overcomes the problems associated with edge wicking by providing a packaging material that is selectively densified at cut edges which may be exposed to the liquid material in the package. Essentially, the present cutting device 10 is configured to densify predetermined portions of the packaging material to reduce wicking and thus absorption.

As best seen in FIG. 2, the blade portion 14 of the cutting device 10 extends from the main body portion 12. In a typical container manufacturing process, the paperboard material, illustrated in FIG. 1 as a laminate L, is crush cut at its edges by the cutting edge 16 of the blade 14. The angled surfaces 18, 20 facilitate cutting the material L. A densifying member 22 extends outwardly from one of the angled surfaces 18 in a step-like manner. The densifying member 22 has a compression surface 24 which is configured to engage and compress the packaging material L, as the cutting device 10 and blade 14 are pressed into the material L. Essentially, the densifying member 22 produces an anvil-like effect which compresses and densifies the material in an area A under the compression surface 24 adjacent to the cut location C. The densifying member 22 has a riser surface 26 which extends from the compression surface 24 to the main body portion 12.

Figure 3:
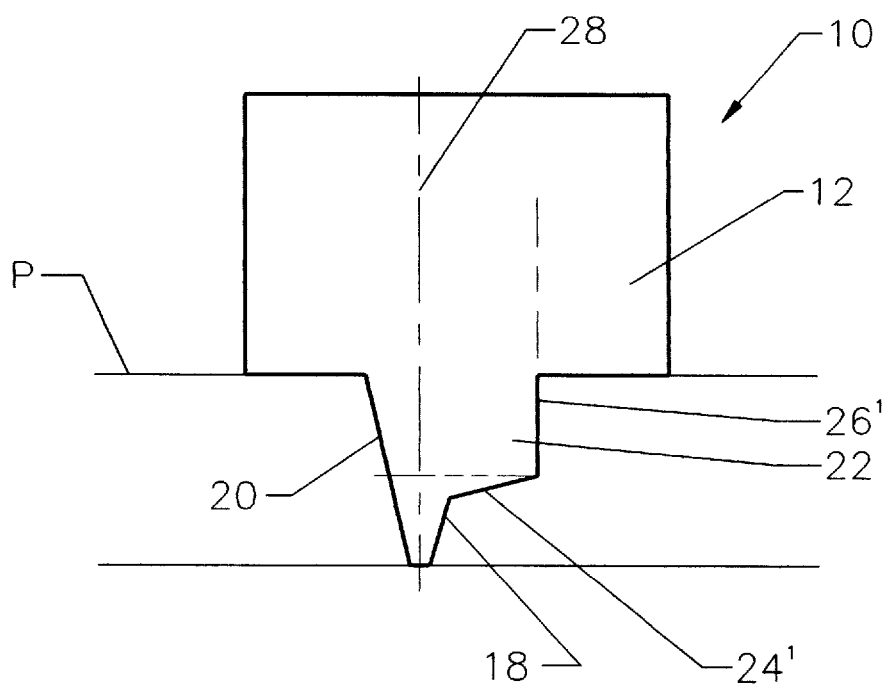
FIG. 3 is a side elevational view of the cutting device illustrating a non-planar compression surface and a riser surface parallel to the centerline of the cutting device blade portion.

In a typical configuration, the cutting edge 16 is a flat surface having a width W of about 2 to about 4 thousands of an inch (2 to 4 mils). The cutting edge 16 is in spaced relation to the main body portion 12. The force of the blade 12 into the material L effects a crush cut of the material L by the cutting edge 16. The densifying member 22 is configured to densify the material in an area A under the member 22, adjacent to the cut C. Typical, the packaging material L is a flat, planar material having a consistent thickness t. In a current embodiment, the compression surface 24 is flat, and is configured to be generally parallel to the plane P of the material. Thus, a substantially consistent densification of the material L in the area A adjacent to the cut C occurs. It will be recognized that the compression surface 24' can be configured other than parallel to the material plane P such that the material L in area A can be selectively, variably densified to produce a desired effect (FIG. 3).

Referring to FIGS. 1 and 2, the angled surfaces 18, 20 extend upwardly from the cutting edge 16 at a predetermined angle. In a current embodiment, each of the surfaces forms an angle $\alpha$ with a centerline of the blade portion, as illustrated by the arrow at 28, of about 30°. In one embodiment, the riser surface 26' is parallel to the centerline 28, i.e., perpendicular to the plane P of the material L (FIG. 3). Alternately, as illustrated in FIGS. 1 and 2, the riser surface 26 can be formed at an angle $\beta$ relative to the blade centerline 28.

In a current embodiment, the densifying member 22 extends outward from the angled surface 18, at about a midpoint of the surface 18 between the cutting edge 16 and the main body portion 12. That is, the surface 18 has a length S, and the member 22 extends from the surface 18 at about a distance of S/2 from the edge 16. Alternately, the member 22 can extend from the surface 18 from other than the midpoint to achieve a specific, desired densification characteristic and result.

Figure 4:
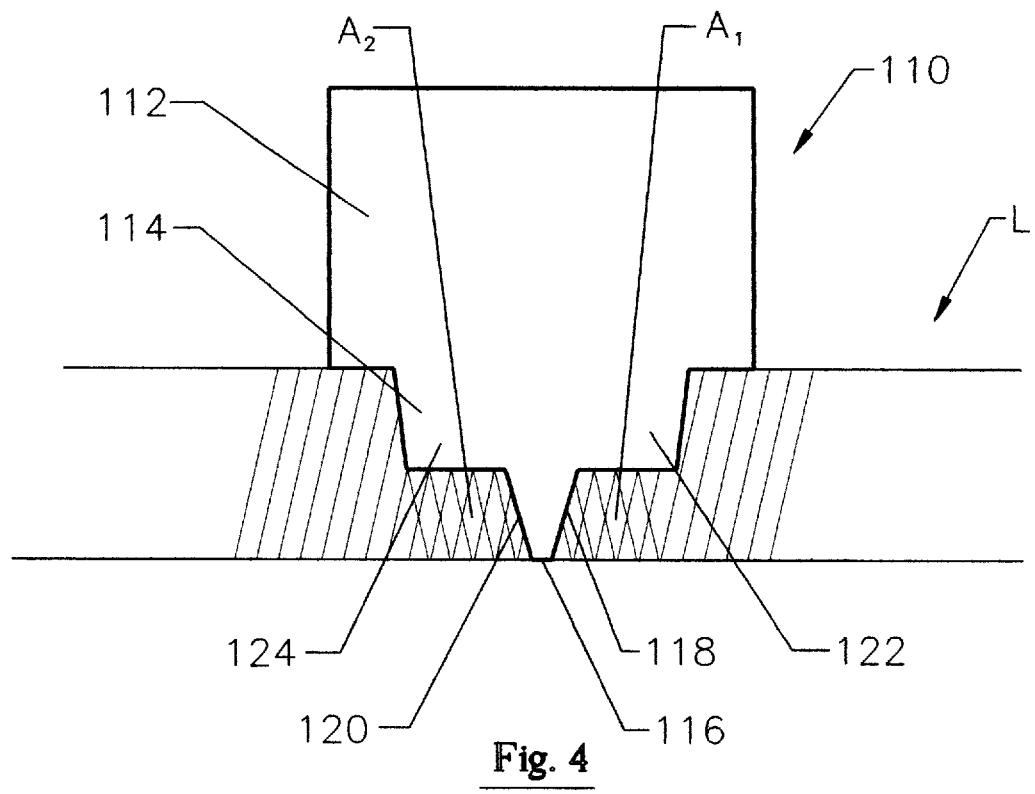
FIG. 4 is a side elevational view of an alternate embodiment of the cutting device, the device being illustrated impressed into a paperboard sheet.
Figure 5:
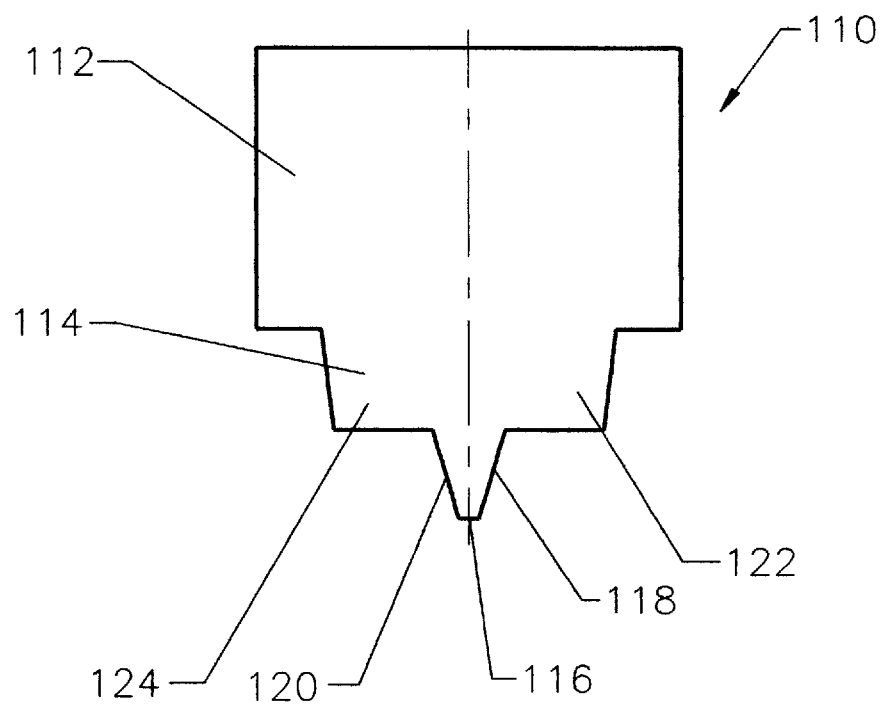
FIG. 5 is a side elevational view of the alternate embodiment without the paperboard.

An alternate embodiment 110 of the cutting device is illustrated in FIGS. 4–5. Similar to the embodiment 10 illustrated in FIGS. 1–3, the alternate embodiment 110 includes a main body 112 portion having a blade portion 114 extending therefrom. The blade 114 includes a cutting edge 116 having first and second angled surfaces 118, 120 extending from the edge 116. The alternate embodiment 110 includes first and second densifying members 122, 124 extending respectively from the first and second angled surfaces 118, 120.

The densifying members 122, 124 may be configured similar to the member 22, and may be similar to one another. Alternately, the first and second members 122, 124 may be formed differently from one another in order to achieve specific desired results at the opposing areas $A_1$, $A_2$ adjacent to the cut.

Figure 6:
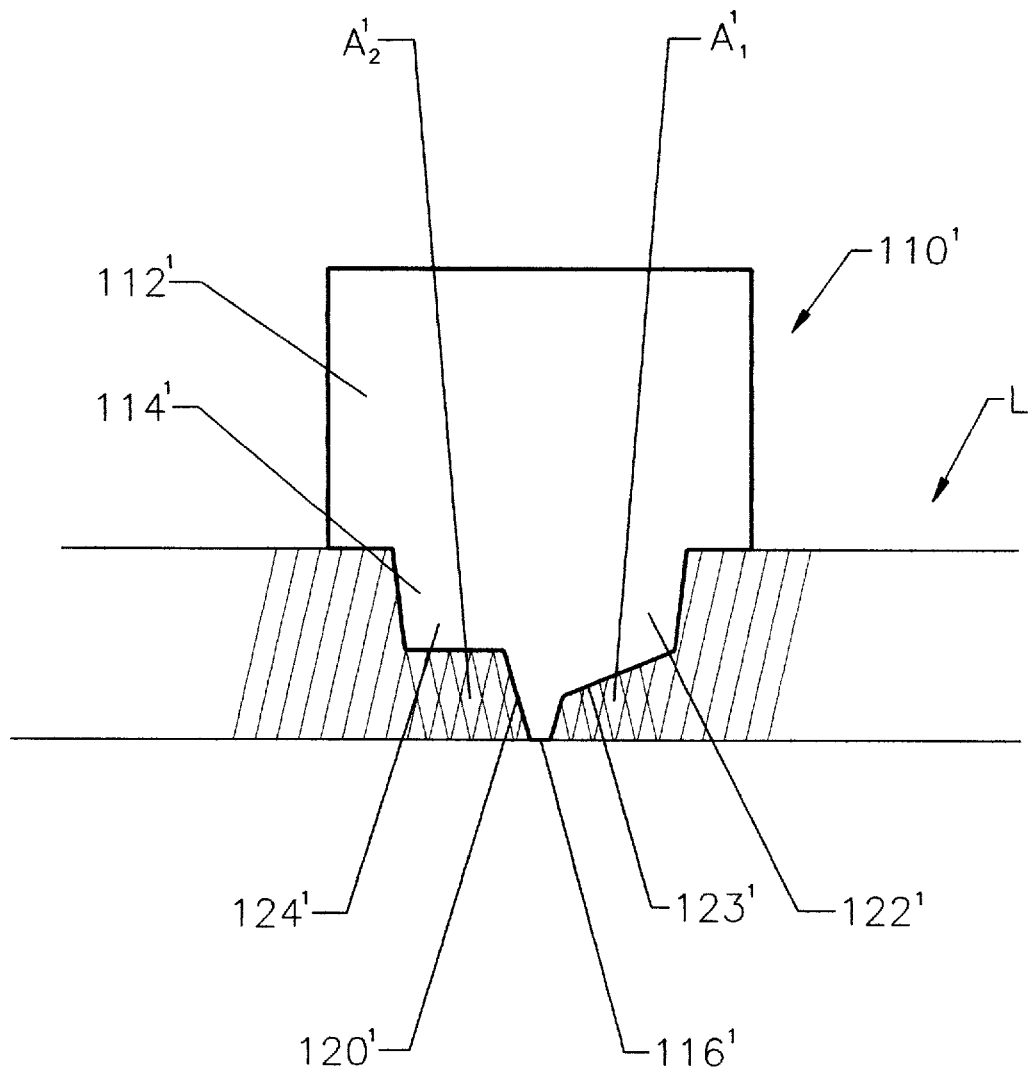
FIG. 6 is a side elevational view of an alternate embodiment of the cutting device with offset densifying members, the device being impressed into a paperboard sheet.

Similar to the embodiment 10, the densifying members 122, 124 of the cutting device 110 can extend from their respective surface 118, 120 from about the midpoint of the surface between the cutting edge 116 and the main body portion 112. Alternately, to achieve specific, desired densification characteristics, the members 122, 124 can extend from their respective surfaces 118, 120 from other than the midpoints. As shown in FIG. 6, the cutting device 110' has a blade portion 114' with a densifying member 122' extending from a surface 118' at a point lower than the midpoint of a cutting edge 116' and a main body portion 112'. The blade portion 114' also has a densifying member 124' extending from a surface 120' at a point higher than the midpoint of the cutting edge 116' and the main body 112'. Additionally, similar to FIG. 3, the densifying member 122' has a non-parallel compression surface 123'. Areas A1' and A2' are compressed differently due to the different positioning of densifying members 122' and 124'.

Notwithstanding the linear appearance of the cutting device embodiments 10, 110, illustrated, it will be recognized by those skilled in the art that both embodiments 10, 110 of the device can be configured in circular, as well as other desired arrangements.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cutting and compression knife for effecting a cut in an associated board-like fibrous material and for densifying an area adjacent to the cut, comprising:

a main body portion;

a cutting edge in spaced relation to the main body portion;

first and second densifying members extending from respective opposing sides of the knife intermediate the main body portion and the cutting edge, the densifying members each having a compression surface configured to engage and compress the area adjacent to the cut as the knife is urged and impressed into the board-like material and as the densifying members contact and compress the area therebeneath, respectively, each densifying member extending from the respective opposing sides of the knife at different distances from the cutting edge so as to effect different densification characteristics thereby.

2. A cutting and compression knife for effecting a cut in an associated board-like fibrous material and for densifying an area adjacent to the cut, comprising:

a main body portion;

a cutting edge in spaced relation to the main body portion;

first and second densifying members extending from respective opposing sides of the knife intermediate the main body portion and the cutting edge, the densifying members each having a compression surface configured to engage and compress the area adjacent to the cut as the knife is urged and impressed into the board-like material and as the densifying members contact and compress the area therebeneath, respectively, each densifying member extending from respective opposing side of the knife at different distances from the cutting edge so as to effect different densification characteristics thereby, at least one of the compression surfaces configured other than parallel to an upper surface of the board-like material.

* * * * *